(No Model.)
R. BURGESS.
VICTUAL CARRIER.
No. 305,790. Patented Sept. 30, 1884.
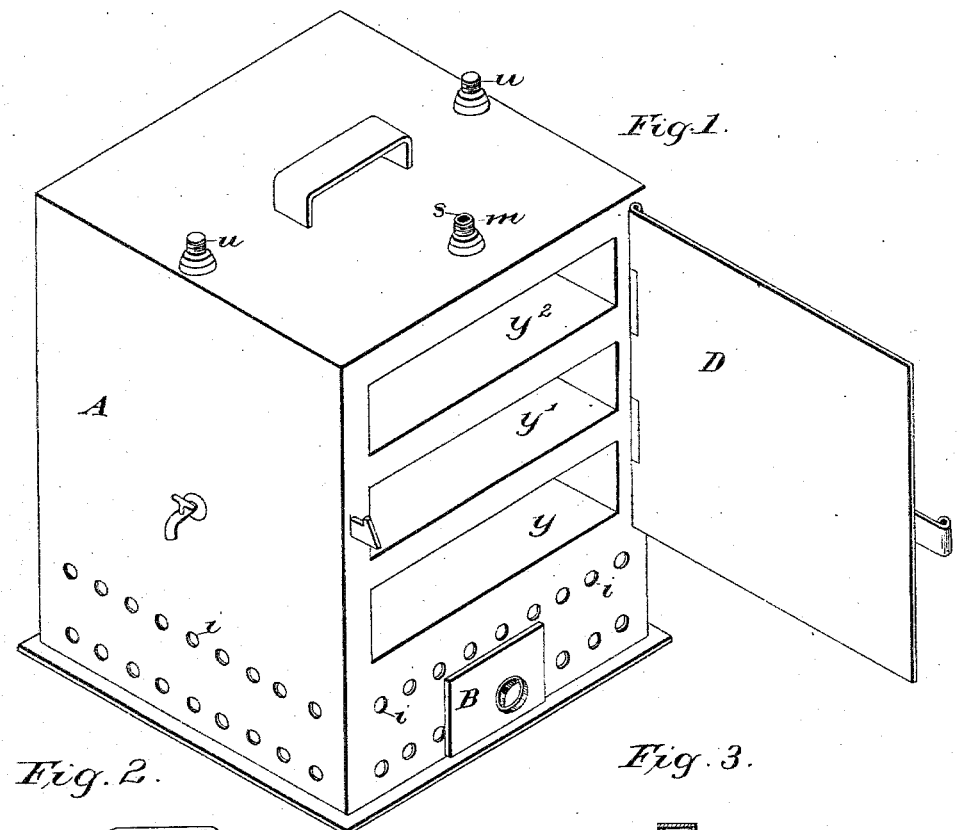
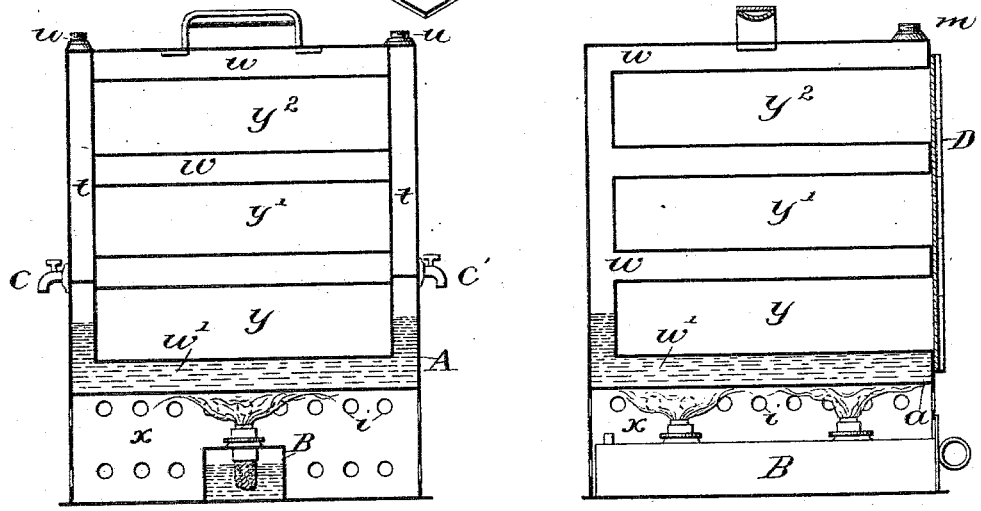
Witnesses:
George N. Cook
Geo. Brock
Inventor:
Rush Burgess
By Presbery & Green
his Attorneys

UNITED STATES PATENT OFFICE.

RUSH BURGESS, OF NEWARK, NEW JERSEY.

VICTUAL-CARRIER.

SPECIFICATION forming part of Letters Patent No. 305,790, dated September 30, 1884.

Application filed February 19, 1884. (No model.)

*To all whom it may concern:*

Be it known that I, RUSH BURGESS, of Newark, Essex county, New Jersey, have invented an Improvement in Victuals-Carriers, of which the following is the specification.

My invention relates to that class of heaters employed for transmitting victuals from the caterer's or for retaining the meals of workmen, &c.; and my invention consists in economically constructing the same so as to retain the heat of the victuals without recooking them.

In the drawings forming part of this specification, Figure 1 is a perspective view of my improved victuals-carrier; Fig. 2, a longitudinal section; Fig. 3, a transverse section.

A is a sheet-metal case divided internally by horizontal and vertical partitions to form a lower chamber, $x$, and upper compartments, $y$ $y'$ $y^2$, between which and the sides and back of the case are spaces $w'$ $w$ for the reception of water and steam, as fully described hereinafter. The sides of the chamber $x$ are provided with air openings or passages $i$, and a detachable lamp, B, is adapted to said chamber.

At the top of the case A is an inlet-opening provided with a cap, $m$, perforated at $s$, and a door, D, is hinged to the case, so as to close the chambers $y$. Water sufficient to fill the space $w'$ between the lower chamber Y and the top of the chamber $x$ is introduced through the inlet-opening. When the lamps are lighted, the heat therefrom will vaporize the water in the chamber $w'$, and the steam will fill the chambers $w$ and maintain the latter at a uniform temperature, so that the victuals placed in the chambers will retain their heat.

In articles of this class it has heretofore been difficult to maintain a uniform temperature, and in most cases the heat is liable to become so great as to recook the victuals, dry them up, and destroy their flavor.

By the above construction the heating of the articles above 212° is prevented, the steam escaping through the opening $s$, which also prevents explosions, the body of water in the chamber $w'$ preventing the overheating of the bottom of the chamber $y$.

To prevent the rapid cooling of coffee or other decoctions, which results from transporting the same in the ordinary pots, a portion of the steam-chambers may be divided by partitions to form receptacles $t$ $t$, into which the liquids may be introduced through inlets $u$ and withdrawn through faucets $c$ $c'$.

By using a series of chambers, $y$ $y'$ $y^2$, I not only prevent the mixing of flavors resulting from placing articles in the same chamber, but also secure slight differences in the temperature, resulting from the radiation of heat as the steam passes upward.

I do not claim, broadly, a victuals-carrier having compartments surrounded by a fluid-chamber heated by a lamp; but

I claim—

The combination of the portable case A, its lamp, victuals-chambers, and steam and water spaces, and receptacles $t$, provided with inlets $u$ and faucets $c$ $c'$, for the purpose set forth.

In testimony whereof I have signed my name to this specification in the presence of two subscribing witnesses.

RUSH BURGESS.

Witnesses:
CLARENCE T. VAN DEREN,
O. E. RUNYON.